Sept. 23, 1969  G. P. LANDGREBE  3,468,112
COMBINE
Filed June 9, 1966  5 Sheets-Sheet 1

INVENTOR.
GEORGE P. LANDGREBE
BY
Charles A. Penfold
ATTORNEY

Sept. 23, 1969  G. P. LANDGREBE  3,468,112
COMBINE

Filed June 9, 1966  5 Sheets-Sheet 4

INVENTOR.
GEORGE P. LANDGREBE
BY Charles S. Penfold
ATTORNEY

Sept. 23, 1969  G. P. LANDGREBE  3,468,112
COMBINE

Filed June 9, 1966  5 Sheets-Sheet 5

INVENTOR.
GEORGE P. LANDGREBE
BY
Charles A. Penfold
ATTORNEY

United States Patent Office 3,468,112
Patented Sept. 23, 1969

3,468,112
COMBINE
George P. Landgrebe, R.R. 4, Box 211,
Valparaiso, Ind. 46383
Filed June 9, 1966, Ser. No. 556,478
Int. Cl. A01d *43/02*
U.S. Cl. 56—364                              8 Claims

ABSTRACT OF THE DISCLOSURE

The invention is directed to a harvester comprising a tapered chute having an enlarged lower extremity for travel along the ground, with a rotatable pickup disposed in this extremity for lifting and directing stalks or stems of fallen grain plants to a transverse screw, which in turn causes medial flow of the plants to a conveyor in an upper smaller extremity of the chute for longitudinal discharge to a thresher.

---

The subject invention relates generally to agricultural equipment and more particularly is directed to what is commonly referred to as a combine.

As a prelude to the following objects, attention is directed to the fact that many grain-bearing plants, and particularly corn, due to inclement weather conditions, may be caused to bend or break and fall in a haphazard pattern onto the ground or soil at a level which cannot be picked up or harvested in a normal way with conventional equipment.

The purpose of the subject invention is to provide a structure embodying improved principles of design and construction whereby particularly fallen corn may be economically salvaged or harvested.

An important object of the invention is to provide a combine comprising a tractor or vehicle provided with threshing mechanism and power means for operating the same and a harvester which is carried by and disposed at the front of the vehicle for the purpose of conditioning and picking up a product such as grain-bearing plants and conveying them for discharge directly to a threshing mechanism.

More particularly, an object of the invention is to provide a harvester which, among other things, comprises an elongate inclined tapered chute having an enlarged or relatively wide lower extremity provided with an inlet for receiving the fallen grain-bearing plants or portions thereof and an upper extremity which is smaller than the lower extremity and provided with an outlet through which the plants and or grain are discharged directly into the threshing mechanism.

A significant object of the invention is to provide the lower extremity of the chute with a rotatable unit constituting a pickup and the upper extremity of the chute with an impeller vane or paddle unit, which units respectively pick up fallen plants at the inlet and expel or discharge them through the inlet.

A specific object of the invention is to provide a combine in which the power means of the vehicle serves to simultaneously rotate the rotatable units of the harvester at relatively high speeds so as to create an air stream of sufficient magnitude to assist in conveying the plants pneumatically through the chute to the threshing mechanism.

Another specific object of the invention is to provide a harvester with means preferably in the form of a roller extending across its front for the purpose of leveling and/or conditioning the grain-bearing plants prior to their reception in the chute and engagement by the lower rotatable unit.

Another object of the invention is to provide the harvester with a pair of side runners located rearwardly of the roller or conditioning means above referred to.

Another object of the invention is to provide means, preferably of a hydraulic character, which is operatively connected to the power means of the vehicle in a manner whereby the chute may be raised and lowered.

Also, an important object of the invention is to provide a modified form of harvester having a chute provided with a pair of rotatable units in its lower extremity, a rotatable unit in its upper extremity, and a mechanical conveyor whereby to assist in conveying the plants or portions thereof through the chute directly into the threshing mechanism, including unique means for driving or operating the units.

An additional and important object of the invention is to provide a chute or assembly which has a realtively large lower inlet provided with a rotatable pickup unit and an upper outlet, with improved conveyor means interposed between the inlet and outlet whereby ot facilitate rapid flow of the product through the chute for direct reception by a threshing machine.

A further object of the invention is to provide a tapered chute having a lower enlarged extremity provided with an inlet and an adjacent rotatable pickup unit, an upper extremity provided with an upper outlet, a conveyor, preferably of an endless belt type, interposed between the rotatable unit and the outlet whereby to facilitate rapid flow of the product through the chute for discharge through the outlet for substantially direct reception by a threshing machine, and a rotatable means which is interposed between the rotatable unit and the conveyor means whereby to promote the travel of the product toward the center of the chute for conditioning and transmission to the conveyor means and thereby obtain substantially continuous uniform flow of the product through the chute.

A still further specific object of the invention is to provide a chute of the character described in the preceding paragraph in which the conveyor means may be in the form of a plurality of substantially corresponding screws.

Also, an object of the invention is to provide a chute in which the means operatively connecting the various movable components of the chute or machine are readily accessible for maintenance and repair and in which provision is made whereby to facilitate convenient access to the interior of the chute so that if, for example, any excessively compacted material interfering with the flow may be manually dislodged.

Additional attributes of the invention reside in providing the combine or machine which offers advantages with respect to efficiency in operation, output, manufacture and assembly, low maintenance costs and durability.

Other objects and advantages of the invention will readily become apparent after the description hereinafter set forth is considered in conjunction with the drawings annexed hereto.

In the drawings:

FIGURES 1 through 8 illustrate one embodiment of the invention;

FIGURES 9 and 10 exemplify a second or modified form of a harvester;

FIGURES 11, 12 and 13 illustrate a third form of a harvester;

FIGURES 14, 15 and 16 exemplify a fourth form of a harvester;

Figures 7, 8, 9:
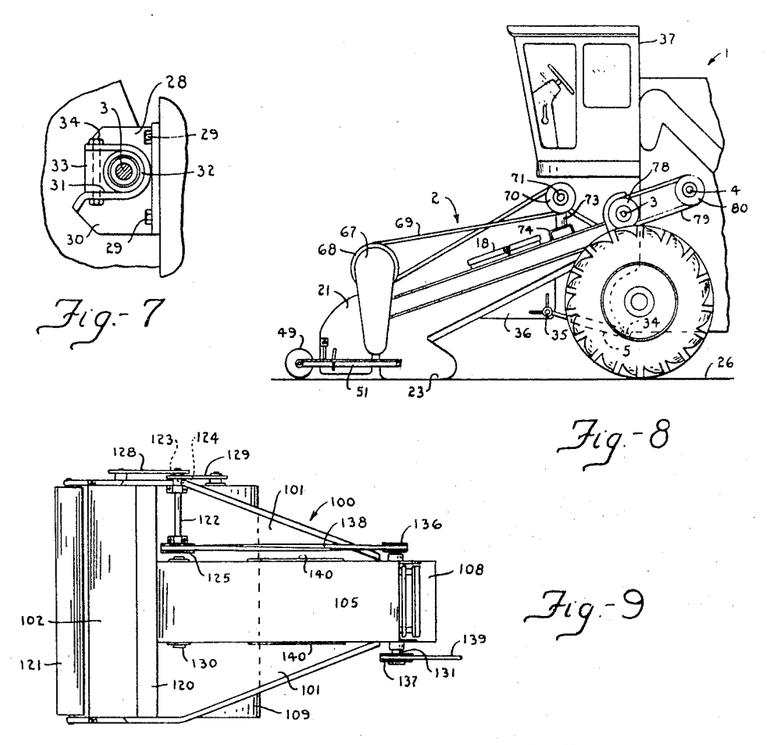
FIGURE 7 is a vertical section taken through a part of the combine illustrated in FIGURE 8 showing a mode of operatively connecting the harvester and vehicle.
FIGURE 8 is a side elevational view of a portion of a vehicle or tractor provided with threshing mechanism and a harvester operatively connected to the vehicle.
FIGURE 9 is a top plane view of the modified harvester.

Referring first to FIGURE 8, there is shown a combine comprising, among other things, a tractor or vehicle generally designated 1 and a harvester generally designated 2 which are preferably pivotally connected by a horizontal pivot shaft 3. The tractor or vehicle may be of a conventional character and, among other things, is provided with power means for operating the vehicle, product conditioning means such as a threshing mechanism, a takeoff shaft 4, and a pair of hydraulic units 5.

The harvester 2 may be designed and constructed in various ways and, among other things, preferably includes an inclined tapered chute 6 which has a relatively large lower extremity 7 provided with an inlet 8 and an upper smaller extremity 9 provided with an outlet 10.

Figures 4, 5, 6:
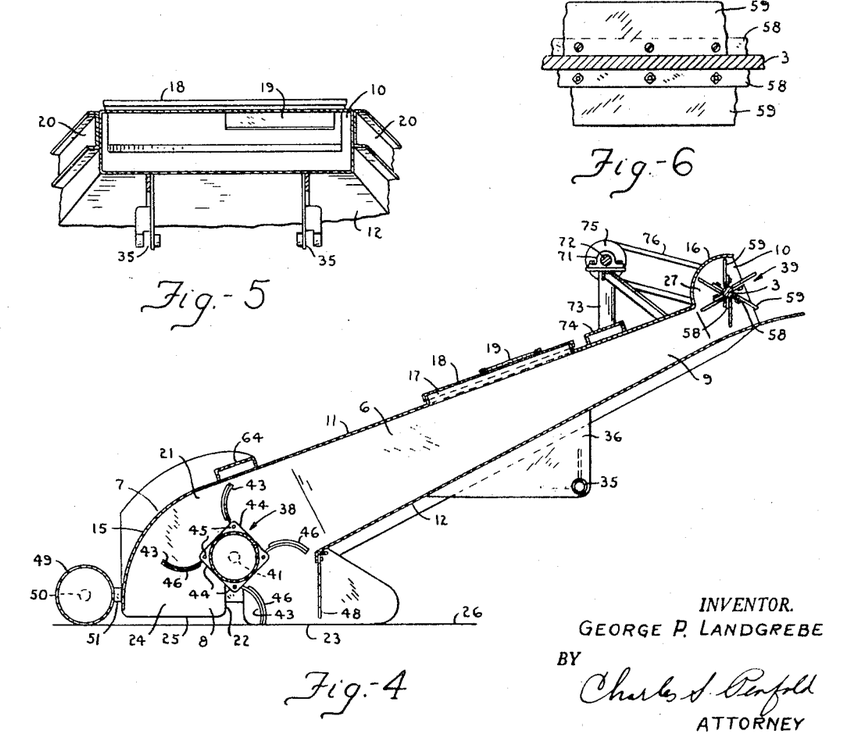
FIGURE 4 is a vertical section taken substantially on line 4—4 of FIGURE 1.
FIGURE 5 is a partial rear end view of the upper extremity of the harvester.
FIGURE 6 is a partial sectional view showing certain details of a rotatable unit of the harvester.

More specifically, the chute as depicted in FIGURE 4 includes a top wall 11, a bottom wall 12, and a pair of parallel side walls 13 and 14, all of which converge upwardly toward the outlet. The top wall has a curved frontal continuation forming a shroud 15 at the lower extremity 7 and with an upturned rearwardly extending continuation 16 defining a part of the outlet 10. The top wall is further provided with a relatively large flanged opening 17 which affords access to the interior of the chute so that, if required, the interior of the chute may be cleaned or compacted plants may be manually dislodge. A manhole cover 18 may be provided with a window 19 so that one may readily view the flow of the plants or produce through the chute.

Figure 1:
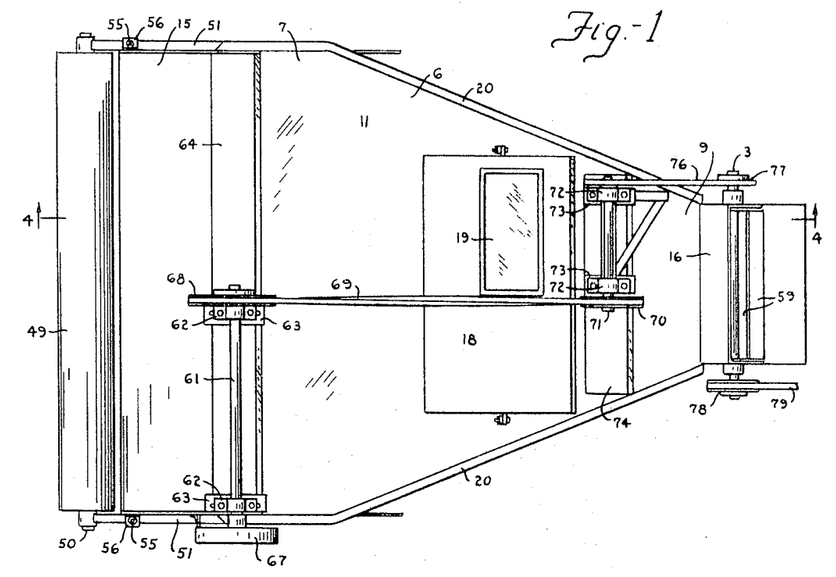
FIGURE 1 is a top plan view of a harvester which constitutes a component of the combine illustrated in FIGURE 8.
Figure 2:
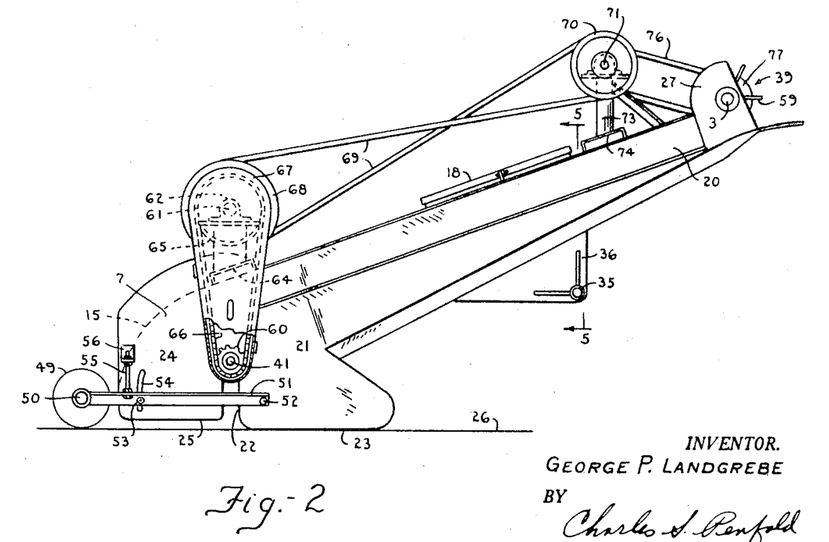
FIGURE 2 is a side elevational view of the harvester or chute illustrated in FIGURE 1.

The side walls 13 and 14 of the chute are preferably reinforced by channel beams or braces 20 which may be spot welded or otherwise secured to the external surfaces of the side walls, as clearly shown in FIGURES 1, 2 and 5. The lower extremities of the side walls are preferably enlarged as at 21 and in combination with the shroud 15 define the lower extremity. The enlargements 21 are interrupted by a pair of vertical notches 22 to provide a pair of portions having relatively long rear runners 23 and a pair of forwardly extending portions 24 having lower marginal edges 25 which are normally spaced above the runners and the surface of the ground 26. The upper extremities of the side walls of the chute are provided with enlargements 27 which, in combination with the upper curved continuation 16 of the top wall and the bottom wall 12, define the outlet 10 above referred to.

As stated above, the harvester 2 is preferably detachably pivotally connected forwardly of the tractor or vehicle by the horizontal shaft 3. This shaft extends transversely through the enlargements 27 of the upper extremity of the chute. More particularly in this respect and as illustrated in FIGURES 7 and 8, portions of the tractor are provided with brackets 28 (one shown) which are preferably detachably secured thereto by fasteners such as screws or bolts 29. Each of the brackets is preferably L-shaped to include a base portion through which the fasteners extend and a wall 30 which is provided with a flanged opening forming a socket 31 for supporting a suitable bearing 32 carried by the shaft 3. The bearings and shaft are preferably detachably firmly held in the socket by abutments 33 (one shown) held in place by bolts 34. The abutments are provided with semicylindrical surfaces cooperating with semicylindrical surfaces of the sockets for embracing the bearings. With this setup, the harvester is firmly pivotally connected to the tractor or vehicle to provide a composite or unitary structure. Obviously, means other than the specific pivotal connection shown may be utilized to operatively connect the tractor and harvester.

Means are employed whereby the harvester may be adjusted with respect to the ground and/or the tractor and this preferably comprises the pair of hydraulic units 5 above referred to. The cylinders of these units are pivotally connected to the tractor as indicated at 34 and the rods of the cylinders are preferably pivotally connected at 35 to reenforced depending portions 36 of the chute at locations intermediate the length of the chute.

A control carried by a dash in a cab 37 may be utilized to control operation of the hydraulic units. These units are primarily employed to raise the harvester when, for example, the combine is being moved from one location to another.

The harvester is preferably provided with a lower rotatable unit generally designated 38 and an upper rotatable unit generally designated 39, which are respectively substantially disposed in the lower and upper extremities of the chute.

More specifically, the purpose of the lower rotatable unit 38 is to simultaneously break and/or cut and/or pick up a product such as fallen grain-bearing plants, particularly corn, for passage through the chute for direct discharge to a threshing mechanism. This rotatable unit may be designed and constructed in various ways but, as exemplified in FIGURES 3 and 4, preferably includes a tubular cylinder having end walls provided with bearings 40 (one shown) and a shaft 41 which extends axially through the cylinder bearings and is fixedly secured to fittings 42 carried by the enlargements 21 in a manner whereby the cylinder, bearings and shaft may be located as a unit. The fittings 42 are detachably connected to the chute and the notches 22 in the enlargements detachably receive the shaft 41 whereby to facilitate mounting of the rotatable unit and removal for replacement, repair or cleaning.

The unit 38 is rotatable in a clockwise direction as shown in FIGURE 4 and is preferably provided with a plurality of circumferentially and longitudinally spaced pivotal elements 43. The pivotal elements are preferably identical in character and mounted in substantially the same way in a generally staggered relationship. More specifically in this respect, the cylinder of the unit 38 is provided with pairs of apertured ears 44 and pivot means 45 extend through the ears for pivotally connecting inner extremities of the elements thereto. Each of the elements 43 is preferably curved and reinforced by a backing 46 conforming and welded or otherwise secured thereto. The parts are preferably made from a material which is wear resistant and non-corrosive. The diameter of the lower rotatable unit and the length and curvature of the pivotal elements are predetermined so that, when the harvester is adjusted, for example, to the position exemplified in FIGURES 4 and 8, the elements will be caused to engage, beat, cut, beat and pick up any fallen product, such as corn and direct it to the upper rotatable unit 39. The rotational speeds of the rotatable units 38 and 39 are preferably synchronized so that the revolving pivotal elements 43 will not only simultaneously pick up the product, but will produce a sufficient stream of air through the chute whereby to assist in promoting its flow through the chute where the discharge is expedited by rotation of the upper rotatable unit.

It will be observed that the bottom wall 12 of the chute is provided with a horizontal flange 47 and that a depending planar baffle, 48, constructed of any suitable material, is secured to the flange so as to assist in preventing backflow of the product and thereby improve its collection.

Figure 3:
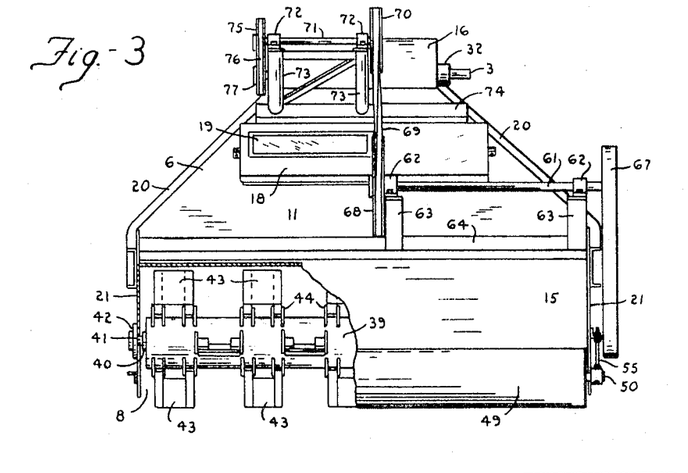
FIGURE 3 is a front elevational view of the harvester with portions broken away for the purpose of illustrating certain details of the construction.

Improved means are preferably provided whereby the harvester may be adjusted with respect to the ground and/or the product for conditioning the product prior to the entry of the latter into the inlet 8. The means, as shown in FIGURES 1, 2, and 3, preferably includes a cylindrical hollow roller 49 carried by a horizontal shaft 50 which is supported by a pair of side arms 51 having inner ends pivotally connected at 52 to the enlarged portions 21 of the side walls of the chute whereby to position the roller forwardly of the chute in spaced relation thereto. The side arms 51 may be pivotally adjusted, for example, through the use of bolts 53 which extend through the arms and arcuate slots 54 provided in the enlarged portions 21 of the chute and by a pair of bolts 55 which are operatively connected to the arms and to lugs 56 fixedly carried by the portions 21. In other words, the components just described afford at least a form of a setup whereby the roller may be readily adjusted and held in any desired pivotal position with respect to the ground or product to be subjected to its influence. The roller is preferably utilized to engage, levelize or otherwise condition and hold down some of the plants to promote their treatment by the rotatable unit and reception by the chute.

The upper rotatable unit 39 may be designed and constructed in various ways and, as exemplified in FIGURES 1, 2, and 4 and 6, it includes the horizontal rotatable shaft 3 having a plurality of circumferentially spaced members 58 which extend both longitudinally and radially with respect to the axes of the shaft, and elements 59, preferably of a resiliently flexible character, which are detachably connected to the members 58. The elements are preferably identical in character and may be constructed of a suitable belting having long-wearing properties, or if so desired, the elements may be rigid. The elements serve to flail, beat, or otherwise engage the product or material and assist in propelling it externally of the chute for discharge through the outlet 10 and directly into the threshing mechanism. This rotatable unit is similar to the lower unit in that it also assists in creating a flow or stream of air whereby to promote the flow and discharge of the product. It will be observed that, due to the generally tapered character of the chute, the product will be funneled to the propelling action of the upper rotatable unit.

Any means suitable for the purpose may be employed to drive or effect rotation of the lower rotatable unit 38. However, as best illustrated in FIGURES 1, 2, 3, and 8, this preferably is accomplished by providing the shaft 41 with a sprocket 60 which is operatively connected to the upper rotatable unit 38 and to the output or drive shaft 4 of the vehicle by a plurality of components. More specifically in this respect, a shaft 61 is preferably journalled in a pair of bearings 62 which are detachably secured to the upper ends of a pair of spaced pillars 63 which are fixedly secured to a cross brace 64, the latter of which is preferably welded or otherwise secured to the top wall 11 of the chute. A sprocket 65 is fixed on the shaft 61 and this sprocket is connected by a chain 66 to the sprocket 60. This chain and the sprockets are protected by a shroud 67 to promote safety. The inner end of the shaft 61 is provided with a pulley 68 which is operatively connected by a crossed belt 69 to a pulley 70 fixed on one end of a shaft 71, journalled in a pair of bearings 72 fixedly secured to a pair of pillars 73, the latter of which are secured to a cross-brace or reinforcement 74 carried by the top wall of the chute in spaced relation to the brace 64. The pillars are preferably stabilized by angularly disposed braces 65 and 66. The opposite end of the shaft 71 is provided with a pulley 75 which is connected by a belt 76 to a pulley 77 carried by the pivot shaft 3, above referred to. The shaft 3 also carried a pulley 78 which is connected by a belt 79 to a pulley 80 on the drive or output shaft 4. With the foregoing arrangement or system, rotation of the output shaft 4 on the tractor will effect simultaneous rotation of the shafts 71, 61, and 41 to effect simultaneous rotation of the upper rotatable unit in a counterclockwise direction and lower rotatable unit in a clockwise direction as indicated by the arrows in FIGURE 4. The rotatable units 38 and 29 may be rotated at any speeds suitable for accomplishing the results desired. For example, the r.p.m. of the lower unit may be operated within a range of somewhere between 750 and 1800 but a range between 1100 and 1200 for harvesting corn has proven satisfactory. The operating range of the upper rotatable unit is preferably somewhat less than that of the lower unit.

Figure 10:
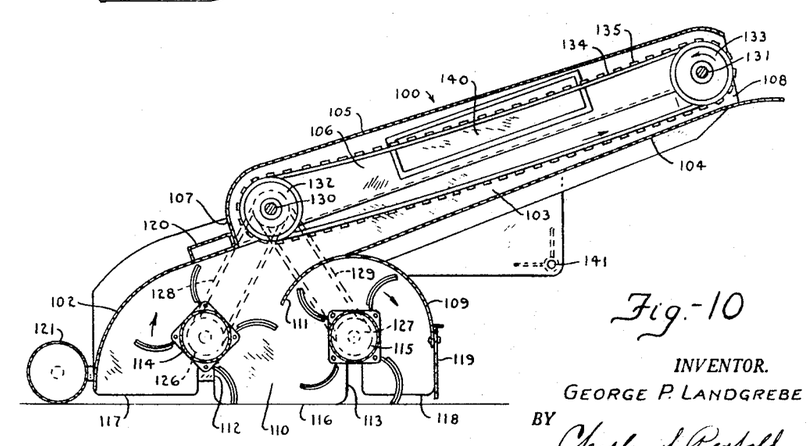
FIGURE 10 is an enlarged vertical section taken through the harvester shown in FIGURE 9.

Referring now to FIGURES 9 and 10 of the drawing, there is illustrated the second embodiment or form of a harvester structure, generally designated 100. This harvester includes a generally tapered chute having a top wall 101 provided with a forwardly and downwardly extending curved continuation constituting a shroud or front wall 102 of a housing or lower extremity. The chute includes a pair of converging parallel side walls 103 (only one shown) and a bottom wall 104 which is disposed in a generally converging relationship with respect to the top wall 101. The top wall is provided with a generally rectangular raised or offset portion. More specifically in this respect, the offset portion includes a top wall 105, a pair of parallel side walls 106 and a front end wall 107. The upper end of the chute is provided with an outlet 108 which is defined by the side walls 103 and 106 and the top and bottom walls 105 and 104. A lower extremity or housing of the chute is defined in part by the front wall 102, above referred to, a rearwardly and downwardly extending curved wall 109 and a pair of enlarged parallel side walls 110. The housing is also provided with a curved inner wall portion 111 which may be considered to be a continuation of the bottom wall 104 and/or the curved rear wall 109. It will be observed that the wall 111 projects into the housing so as to more or less define a pair of compartments.

The enlarged side walls 110 of the housing of the chute are preferably interrupted by a pair of vertical slots 112 and 113 which respectively receive bearings for a pair of rotatable pickup units 114 and 115 in a manner similar to that of the rotatable unit 38 above referred to. It will be observed that the side walls 110 are provided with lower marginal edges 116 constituting runners and with lower marginal edges 117 and 118 which are respectively located forwardly and rearwardly and above the runners 116. It will be further observed that the housing is preferably provided with a depending baffle 119 which is detachably connected to the rear wall 109 for a purpose corresponding to that of the baffle 48 above referred to. The chute or housing is preferably reinforced by a transversely extending channel brace 120.

The chute or housing thereof is preferably provided with a roller 121 for a purpose corresponding to that of the roller 49, above referred to, and it may be mounted in any mode desired or be eliminated.

The means employed for operating the rotatable units and a conveyor will now be described. A horizontal shaft 122 is suitably mounted and journalled on the chute and its outer extremity is provided with a pair of sprockets 123 and 124 and its inner end with a pulley 125. The forward rotatable unit 114 includes a horizontal shaft to which is affixed a sprocket 126 and a shaft of the rear rotatable unit 115 carries a sprocket 127. A chain 128 connects the sprocket 126 with the sprocket 124 on the shaft 122 and a chain 129 operatively connects the sprocket 127 with the sprocket 123.

A horizontal shaft 130 is supported and journalled on the side walls 106 of the offset of the chute and carries a pair of pulleys 132 (one shown) and a shaft 131 is similarily supported and journalled and carries a pair of pulleys 133 (one shown). The pulleys 132 and 133 are preferably operatively connected by an endless conveyor belt 134 provided with longitudinally spaced transverse cleats or abutments 135. The shaft 131 is provided with a pulley 136 at one end and with a pulley 137 at its opposite end. An endless crossed belt 138 operatively connects the pulley 125 on the shaft 122 and the pulley 136 on the shaft 131 and a belt 139 is connected to the pulley 137 on the shaft 131 for connection with a drive or output shaft, such as 4, above referred to, in a manner whereby rotation of the output shaft will impart simultaneous motion to the various sprockets, pulleys and belts to cause the rotatable units 114 and 115 to rotate in clockwise directions as indicated by the arrows and the conveyor or belt 134 to operate in the direction as indicated by the arrows.

The harvester illustrated in FIGURES 9 and 10 offers a dual or multiple pickup structure whereby to promote the efficiency or operation of the structure and means for positively longitudinally conveying the picked up or conditioned product through the chute structure for discharge through the outlet 108 directly to a conditioner carried by the vehicle or tractor. If desired, the side walls 106 of the rectangular offset of the chute may be provided with longitudinal openings having closures 140 whereby to obtain access to the interior of the chute structure for maintenance purposes or the removal of any of the compacted material or product.

The shaft 131 may be utilized to connect the harvester to the vehicle or tractor and means 141 may be employed to facilitate its connection to hydraulic units or other means suitable for lifting and lowering the lower extremity of the harvester.

Figure 11:
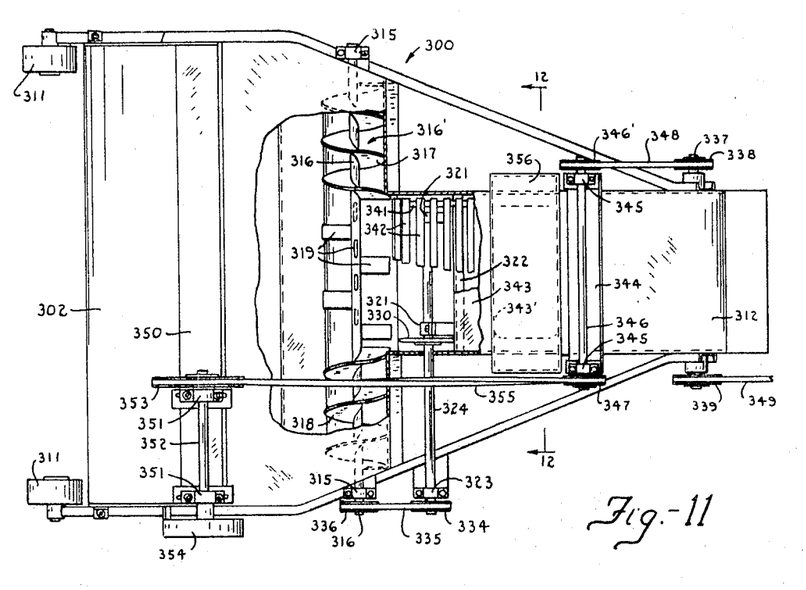
FIGURE 11 is a top plan view of the third form.
Figures 12, 13:
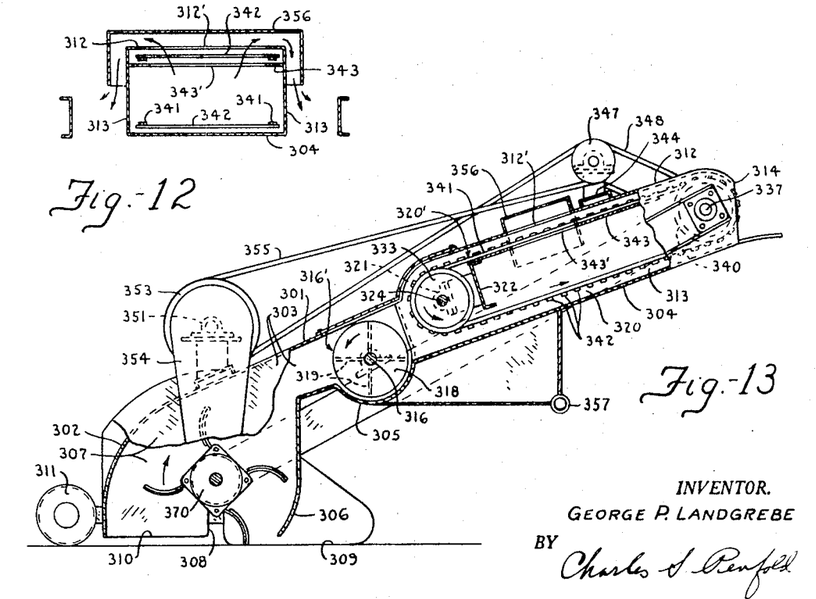
FIGURE 12 is a transverse section taken substantially on line 12—12 of FIGURE 11.
FIGURE 13 is a side elevational view of the structure shown in FIGURE 11 with portions in section to depict details.

The third modification or embodiment of the harvester structure generally designated 300 is illustrated in FIGURES 11, 12 and 13 of the drawing. More particularly, the harvester, among other things, comprises a chute having an inclined top wall 301 provded with a curved or arcuate frontal continuation or end wall 302 of a housing, a pair of side walls 303, and an inclined bottom wall 304. The bottom wall is preferably provided with a downwardly extending substantially semicircular portion 305 and a depending baffle 306 having a curved inwardly extending lower extremity. The lower extremity of the chute is enlarged to provide the housing which is defined in part by the front wall 302, baffle 306, and a pair of enlarged parallel side walls 307. The enlarged side walls 307 are preferably interrupted by vertical slots or receiving means 308 whereby to accommodate a rotatable pickup unit 370 in a mode similar to that for the rotatable units 38, 126 and 127, above referred to. The slots 308 also serve to more or less divided the side walls 307 into rearwardly extending portions having lower horizontal marginal edges which constitute runners 309 and forwardly extending portions having lower edges 310 which are disposed above the runners 309.

A pair of wheels 311 may be adjustably connected to the enlarged side walls 307 or to means carried by these walls whereby to assist in stabilizing the position of the harvester while it is being moved forwardly by a tractor or vehicle.

The chute is preferably provided with a generally rectangular raised portion or offset having an inclined top wall 312 provided with an access opening 312' and a pair of vertical parallel side walls 313. The bottom wall 304 of the chute, top wall 312 of the offset and side walls 313 define an outet or discharge opening 314.

A pair of bearings 315 are carried by the chute and rotatably support a rotatable shaft 316 of a rotatable unit generally designated 316'. This shaft is provided with a pair of longitudinally spaced screws 317 and 318 and with a plurality of radial paddles or impeller elements 319 which are interposed between the screws 317 and 318 and circumferentially and longitudinally spaced, as clearly illustrated. The screws 317 and 318 serve to direct the product or material picked up by the rotatable unit 370 toward the center of the chute where it is acted upon by the impeller elements 319 for transmission through an elongate chamber 320 which is defined by the top wall 312, side walls 313 and bottom wall 304. More specifically, the product travels between the lower portion of a conveyor means 320' and the bottom wall 304.

A pair of bearings 321 is mounted on suitable supports 322 disposed in the chamber 320 and an external bearing 323 is mounted on the chute. A horizontal shaft 324 is journalled in the three bearings 321 and 323 and provided with a pair of pulleys 333 (one shown) within the confines of the chamber 320 and with a pulley 334. The pulley 334 is connected by a belt 335 to a pulley 336 fixed on the shaft 316.

The upper extremity of the chute is provided with a horizontal rotatable shaft 337 which, among other things, is adapted to connect the harvester to the vehicle or tractor in a manner similar to that above described. The ends of the shaft 337 are respectively provided with pulleys 338 and 339 and also with a pair of pulleys 340 (one shown) corresponding to the pulleys 333. The shaft 337 is preferably carried by bearings which are suitably mounted on the sides of the chute at its upper extremity. The sides of the chute may be reinforced by suitable channel reinforcements similar to 20 above referred to.

The conveyor means generally designated 320' of any suitable type is adapted for movement within the chamber 320. More specifically, the one shown is preferably comprised of a pair of endless belts 341, which are respectively carried by the pairs of pulleys 333 and 340, and longitudinally spaced cross cleats or abutments 342. A member 343 is supported within the chamber 320 and, among other things, may be utilized to stabilize the conveyor means. The member 343 may be provided with an access opening 343'.

The harvester 300 is also provided with a transverse reinforcement 344 which supports a pair of spaced bearings 345 which journal a horizontal shaft 346, the latter of which is provided with pulleys 346' and 347 adjacent its ends. A belt 348 operatively connects the pulley 346' with the pulley 338 on the shaft 337 and a belt 349 connected to the pulley 339 on the shaft 337 is intended to be operatively connected to a drive or output shaft, such as 4 on the tractor or vehicle for operating the sprockets, pulleys, belts, chains and shafts.

The harvester is further provided with a reinforcing cross member 350 adjacent the top of its lower extremity and this reinforcement is provided with a pair of spaced bearings 351 which journal a horizontal shaft 352, the latter of which is provided with a pulley 353 and a sprocket (not shown) disposed in a shroud 354. A crossed belt 355 operatively connects the pulley 347 on the shaft 346 and the pulley 353 with shaft 352. A chain (not shown) operatively connects the sprocket on the shaft 352 with a sprocket (not shown) carried by a shaft of the rotatable unit 370 in a mode corresponding to that above described.

The offset portion of the chute may be provided with a removable cover 356 for the opening 312' and the disposition of this cover is such that when the machine is in operation, air and/or dust may flow through the access opening 343' in the member 343, through the spaces between the cross abutments 342, about the conveyor means, through the opening 312' and then laterally, downwardly and outwardly free of the harvester as indicated by the arrows in FIGURE 12.

Means 357, suitably braced, is carried by the underside of the harvester whereby to facilitate its connection with any means suitable for raising or lowering the harvester with respect to the vehicle or tractor.

In view of the foregoing, it should be manifest that rotation of the shaft 337 through its connection by the belt 349 to a drive shaft will impart simultaneous rotation to the shaft 346 through the agency of the belt 348, as well as to the shaft 324 for effecting movement of the conveyor in the direction indicated by the arrows in FIGURE 13. It will also be apparent that rotation of the shaft 324 also simultaneously rotates the shaft 316 and that rotation of shaft 346 simultaneously rotates the shaft 352 so that the latter, through the agency of a chain drive or other suitable mechanism, serves to simultaneously rotate the pickup unit 370. The unit 370 is preferably provided with pivotal pickup elements corresponding to those above described and the same is true of the pivotal elements provided on the rotatable units 126 and 127. Rotation of the pickup unit 370 in a clockwise direction, as indicated by the arrows, serves to condition, cut, break and pick up the product for transmission to the rotatable unit 316'. The r.p.m. of the rotatable unit 370 is preferably such that air pressure is created in a manner whereby to assist in conveying the product toward the discharge outlet 314. As stated above, the screws 317 and 318 serve to direct the incoming product toward the impeller elements 319 so they will assist in directing the product to the conveyor 320' so the latter may engage and direct the product longitudinally in a path between a lower portion of the conveyor and the bottom wall 304 of the chute and through the outlet 314 for direct transmission to any desirable means for further conditioning.

A fourth modification or embodiment of the invention is exemplified in FIGURES 14, 15 and 16 and will now be described. There is shown a harvester generally designated 400 which, among other things, comprises a chute having an inclined top wall 401 and a bottom wall structure having a pair of spaced longitudinally extending substantially semicircular channels or formations 402, and a pair of vertical side walls 403. The top wall 401 is preferably provided with a forwardly extending curved wall 404 having a depending vertical continuation constituting a front wall 405 of a housing 500. The bottom wall structure 402 is preferably provided with a depending wall 406 having a curved continuation 407. The wall 406 in combination with the front wall 405 and a pair of enlarged side walls 408 define the housing 500 constituting a lower enlarged extremity of the chute.

The side walls 408 of the housing are preferably interrupted by a pair of vertical slots 409, which more or less divide the side walls into rear portions having lower edges constituting runners 410 and forward portions provided with lower marginal edges 411 which are disposed at a predetermined elevation above the runners 410. The enlarged side walls 408 are preferably provided with generally triangular portions extending rearwardly of the continuation 406 and these preferably respectively carry a pair of wheels 412 which are adjustably supported so that, if found desirable, the lower extremity of the chute may rest solely upon the wheels 412 or, if desired, the wheels may be utilized in combination with the runners for supporting the extremity, or the wheels may be elevated to nonuseable positions.

The top wall 401 of the chute is preferably provided with a generally rectangular portion having a top wall 401' and this wall, in combination with the bottom wall 402 and the side wall 403, define an outlet 413 for discharging the product conveyed by the chute to any suitable means for further conditioning the product if so desired.

A pair of bearings 414 are provided adjacent the sides of the chute and rotatably support a shaft 415 of a rotatable unit generally designated 415'. The shaft of this unit is provided with a pair of spaced screw portions 416 and 417 and with a plurality of radial impeller elements 418 therebetween for a purpose substantially corresponding to that of the rotatable unit 316', above referred to, and particularly to a conveyor means preferably comprised of a pair of screw spaced longitudinally extending screw conveyors 419 and 420, portions of which are nested in the channels 402, as illustrated in FIGURE 15. The screw conveyors 419 and 420 include shafts 421 the ends of which are supported by bearings 423 and 424. The outer end of each of the shafts 421 is preferably provided with a gear 425. A horizontal shaft 426 is journalled in the upper extremity of the chute and its opposite ends respectively carry a pair of pulleys 427 and 428 and a pair of gears 425' which engage the gears 425 on the shafts 421.

A reinforcing member 429 is secured in a transverse position to the upper portion of the chute and carries three bearings 430, 431 and 432 which journal a shaft 433. This shaft carries a plurality of longitudinally spaced pulleys 434, 435 and 436. A belt 437 operatively connects the pulley 435 and the pulley 427 on the shaft 426. A pulley 438 is carried by the shaft 415 of the rotatable unit 415' and a belt 439 operatively connects the pulley 438 with the pulley 434 on the shaft 433.

A reinforcing member 439 is secured in a transverse position on the upper side of the lower extremity of the chute in spaced relation to the reinforcements 429 and carries a pair of longitudinally spaced bearings 440 which journal a horizontal shaft 441 which carries a pulley 442. A crossed belt 443 operatively connects the pulley 442 with the pulley 446 on the shaft 433. A rotatable pickup unit similar to the pickup unit 38 above referred to is adapted for disposition in the housing or lower extremity of the chute and the shaft of this unit is preferably provided with a sprocket which is operatively connected by a chain to a sprocket carried by the shaft 441 in a manner whereby rotation of the latter will effect rotation of the pickup unit in a clockwise direction for directing the product to a rotatable unit 415'.

The shaft 426, above referred to, is adapted for connection with a tractor or vehicle in any suitable manner or, if desired, some other means for effecting a connection may be utilized. A belt 444 connects the pulley 428 on the shaft 426 and is adapted for connection with a drive or output shaft, such as 4, on the tractor or vehicle for imparting simultaneous rotation to the rotatable pickup, rotatable unit 415' and screw conveyors 419 and 420.

The top wall 401 of the chute may be provided with an access opening 445 and a cover 446 therefor and may further be provided with an opening 447 which may be covered by a screen or filter 448. A cover 449 is adapted for disposition over the opening 447 and screen 448 as clearly shown so that air and/or dust may flow about the conveyor screws 419 and 420, through the opening and screen, and laterally and downwardly through passages 450 and clear of the chute, as indicated by the arrows in FIGURE 15.

If found desirable, means 452 may be utilized whereby to facilitate connection of the harvester to a means such as a pair of hydraulic units for raising and lowering the chute with respect to the ground.

Figure 14:
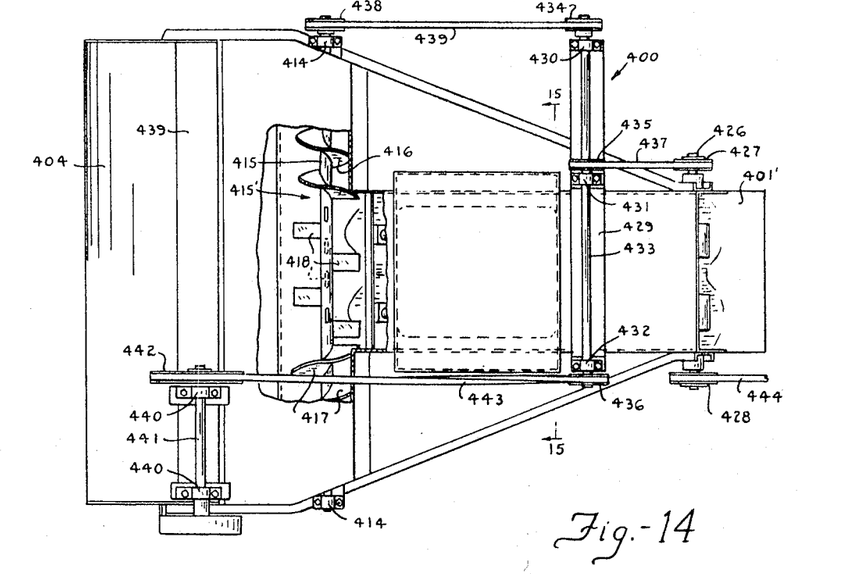
FIGURE 14 is a top plan view of the fourth form.
Figures 15, 16:
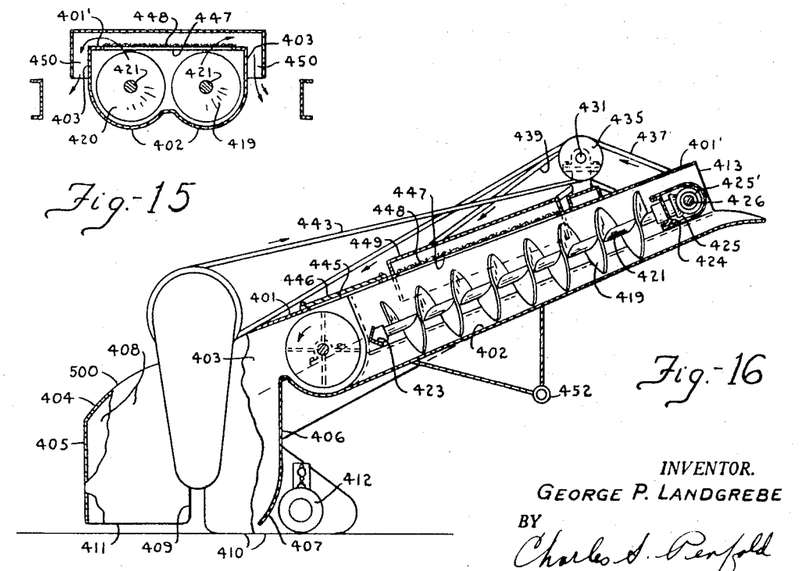
FIGURE 15 is a transverse section taken substantially on line 15—15 of FIGURE 14.
FIGURE 16 is a side elevational view of the structure shown in FIGURE 14 with portions in section to depict details.

As to the operation of the modification shown in FIGURES 14, 15 and 16, rotation of the pickup unit serves to pick up the product and direct it to the rotatable unit 415' where it is acted upon in a manner to cause it to flow to the conveyor means 419 and 420, for transmission through the chute and out of the outlet 413 for direction to a location desired.

Having thus described my invention, it is obvious that various modifications may be made in the same without departing from the spirit of the invention and, therefore, I do not wish to be understood as limiting myself to the exact forms, constructions, arrangements, and combinations of parts herein shown and described.

I claim:

1. In combination: a vehicle provided with means for conditioning a product and power means for operating the conditioning means, an elongated chute having an upper extremity provided with an outlet and a lower extremity provided with an inlet for receiving a product, means for connecting said upper extremity to said vehicle, a rotatable pickup unit disposed in said lower extremity, a first conveyor means disposed in said chute adjacent said outlet, said second conveyor means disposed transversely in said chute between said pickup unit and said first conveyor means for directing the product received from the pickup unit toward the center of the chute for transmission substantially directly to said first conveyor means, means operatively connecting said power means with said pickup unit and both of said conveyor means, actuating means connecting said vehicle to said chute at a location spaced from said first-mentioned connecting means, and means operatively connecting said actuating means with said power means whereby the lower extremity of said chute may be raised or lowered.

2. The combination defined in claim 1, in which said first conveyor means comprises a pair of screw conveyors.

3. A harvester comprising an elongated chute having an upper extremity provided with an outlet and a lower extremity for movement relative to the ground and provided with an inlet for receiving a product, and means for conducting the product from said inlet in said chute and toward said outlet, said conducting means comprising a rotatable pickup unit disposed in said lower extremity and conveyor means disposed transversely in said chute between said pickup unit and said outlet.

4. A harvester comprising an elongated chute having an upper extremity, an outlet and a lower extremity for movement relative to the ground and provided with an inlet for receiving a product, a rotatable pickup unit disposed in said lower extremity for receiving the product at said inlet, and conveyor means disposed transversely in said chute between said pickup unit and said upper extremity for conducting the product toward said outlet.

5. A harvester comprising an elongated chute having an upper extremity, an outlet and a lower extremity for movement relative to the ground and provided with an inlet for receiving a product, and means for conducting the product from said inlet through said chute and out said outlet, said conducting means comprising a rotatable pickup unit disposed in said lower extremity, first conveyor means disposed in said chute adjacent said outlet, second conveyor means disposed transversely in said chute between said pickup unit and said first conveyor means for transmitting the product received from said pickup unit substantially directly to said first conveyor means.

6. The harvester defined in claim 5, in which said first conveyor means comprises a pair of screw conveyors.

7. A harvester comprising an elongated chute having an upper extremity, an outlet and a lower extremity for movement relative to the ground and provided with an inlet for receiving a product, a rotatable pickup unit disposed in said lower extremity for receiving the product at said inlet, first conveyor means disposed adjacent said outlet, second conveyor means disposed in said chute between said pickup unit and said first conveyor means for conducting the product to the latter from said pickup unit, means operatively connecting said pickup unit and said first conveyor means, and means operatively connecting said first and second conveyor means.

8. The harvester defined in claim 7, in which said first conveyor means comprises a pair of screw conveyors.

References Cited

UNITED STATES PATENTS

| 2,607,180 | 8/1952 | Stankavich et al. | 56—330 |
| 2,634,573 | 4/1953 | Carroll | 56—364 X |
| 2,955,403 | 10/1960 | McKee | 56—364 X |
| 3,020,696 | 2/1962 | Thurow | 56—364 |
| 3,221,483 | 12/1965 | Ronning | 56—364 X |
| 3,331,195 | 7/1967 | Heth et al. | 56—24 |

FOREIGN PATENTS 41,426    3/1910    Austria.

LUCIE H. LAUDENSLAGER, Primary Examiner

U.S. Cl. X.R.

56—24, 330, 344